(12) United States Patent
Boucher et al.

(10) Patent No.: US 10,735,347 B2
(45) Date of Patent: *Aug. 4, 2020

(54) UPSTREAM BANDWIDTH MANAGEMENT METHODS AND APPARATUS

(75) Inventors: Antoine Boucher, London (CA); Allan Lodberg, Port Dover (CA)

(73) Assignee: Comcast Cable Communications Management, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/470,901

(22) Filed: May 14, 2012

(65) Prior Publication Data

US 2012/0224501 A1 Sep. 6, 2012

Related U.S. Application Data

(63) Continuation of application No. 11/082,244, filed on Mar. 16, 2005, now Pat. No. 8,201,205.

(51) Int. Cl.
| | |
|---|---|
| *H04L 12/911* | (2013.01) |
| *H04L 12/841* | (2013.01) |
| *H04L 12/28* | (2006.01) |
| *H04N 7/173* | (2011.01) |
| *H04N 21/24* | (2011.01) |
| *H04L 12/851* | (2013.01) |
| *H04L 12/801* | (2013.01) |
| *H04L 12/18* | (2006.01) |

(52) U.S. Cl.
CPC ........ *H04L 47/822* (2013.01); *H04L 12/2801* (2013.01); *H04L 47/15* (2013.01); *H04L 47/2433* (2013.01); *H04L 47/28* (2013.01); *H04L 47/70* (2013.01); *H04L 47/781* (2013.01); *H04L 47/821* (2013.01); *H04L 47/823* (2013.01); *H04N 7/17309* (2013.01); *H04N 21/2408* (2013.01); *H04L 12/1881* (2013.01)

(58) Field of Classification Search
CPC . H04L 12/5695; H04L 47/781; H04L 47/821; H04L 47/822; H04L 47/823; H04L 47/28; H04L 47/15; H04L 47/2433; H04L 12/2801; H04N 7/17309; H04N 21/2408
USPC ........ 370/230.1, 229, 235, 462, 252, 235.1, 370/486, 232, 230; 455/5.1; 709/228; 348/1; 725/125

See application file for complete search history.

(56) References Cited

U.S. PATENT DOCUMENTS

| | | | | |
|---|---|---|---|---|
| 5,361,394 | A | * | 11/1994 | Shigihara ...................... 725/131 |
| 5,687,167 | A | | 11/1997 | Bertin et al. |
| 5,761,191 | A | * | 6/1998 | VanDervort .......... H04L 41/142 370/232 |
| 5,872,588 | A | * | 2/1999 | Aras ................... H04N 7/17354 348/E7.075 |
| 5,926,476 | A | | 7/1999 | Ghaibeh |
| 6,028,860 | A | | 2/2000 | Laubach et al. |
| 6,125,105 | A | * | 9/2000 | Edwards ................ G06Q 10/06 370/230 |
| 6,148,081 | A | | 11/2000 | Szymanski et al. |
| 6,331,987 | B1 | * | 12/2001 | Beser ...................... H04L 47/24 348/E7.07 |
| 6,427,238 | B1 | | 7/2002 | Goodman et al. |

(Continued)

*Primary Examiner* — Kwang B Yao
*Assistant Examiner* — Syed M Bokhari
(74) *Attorney, Agent, or Firm* — Banner & Witcoff, Ltd.

(57) ABSTRACT

A system and method for managing bandwidth of an upstream communications channel in a communications system.

23 Claims, 4 Drawing Sheets

(56) References Cited

U.S. PATENT DOCUMENTS

| | | |
|---|---|---|
| 6,502,135 B1 | 12/2002 | Munger et al. |
| 6,594,246 B1 | 7/2003 | Jorgensen |
| 6,915,530 B1* | 7/2005 | Kauffman et al. ............ 725/125 |
| 6,941,574 B1 | 9/2005 | Broadwin et al. |
| 6,970,641 B1 | 11/2005 | Pierre et al. |
| 7,017,175 B2 | 3/2006 | Alao et al. |
| 7,027,461 B1 | 4/2006 | Bontempi |
| 7,055,169 B2 | 5/2006 | Delpuch et al. |
| 7,065,780 B2 | 6/2006 | Barbier et al. |
| 7,231,455 B2 | 6/2007 | Marejka et al. |
| 7,305,697 B2 | 12/2007 | Alao et al. |
| 7,362,704 B2 | 4/2008 | Sisto et al. |
| 7,426,185 B1* | 9/2008 | Musacchio ............ H04Q 3/68 370/235.1 |
| 7,433,953 B1 | 10/2008 | Kappler et al. |
| 7,468,945 B2 | 12/2008 | Enomoto et al. |
| 7,650,379 B2 | 1/2010 | Hart et al. |
| 7,876,696 B2 | 1/2011 | Kotelba |
| 7,917,648 B2 | 3/2011 | Wu et al. |
| 8,201,205 B2 | 6/2012 | Boucher et al. |
| 8,213,301 B2 | 7/2012 | Park et al. |
| 8,396,055 B2 | 3/2013 | Patel et al. |
| 8,682,363 B1 | 3/2014 | Cardi et al. |
| 8,843,652 B2 | 9/2014 | Balasubramanian |
| 8,850,480 B2 | 9/2014 | Chane et al. |
| 9,106,557 B2 | 8/2015 | Wolcott et al. |
| 9,461,955 B1 | 10/2016 | Sherrets |
| 9,635,421 B2 | 4/2017 | Tidwell et al. |
| 2002/0006111 A1 | 1/2002 | Akita et al. |
| 2002/0126673 A1 | 9/2002 | Dagli et al. |
| 2002/0142780 A1 | 10/2002 | Airy et al. |
| 2002/0188732 A1* | 12/2002 | Buckman ............ H04L 47/10 709/228 |
| 2003/0210665 A1 | 11/2003 | Salmenkaita et al. |
| 2004/0177087 A1 | 9/2004 | Wu et al. |
| 2004/0257995 A1 | 12/2004 | Sandy et al. |
| 2005/0047783 A1* | 3/2005 | Sisto ............ H04L 47/15 398/71 |
| 2005/0076339 A1 | 4/2005 | Merril et al. |
| 2005/0094558 A1* | 5/2005 | Lu ............ H04W 28/08 370/229 |
| 2005/0195968 A1 | 9/2005 | Park et al. |
| 2005/0281235 A1 | 12/2005 | Beach et al. |
| 2006/0053146 A1 | 3/2006 | Allhusen et al. |
| 2006/0099956 A1 | 5/2006 | Harada et al. |
| 2006/0120282 A1* | 6/2006 | Carlson ............ H04L 12/2801 370/229 |
| 2006/0142040 A1 | 6/2006 | Jones |
| 2006/0184664 A1 | 8/2006 | Jung |
| 2006/0212917 A1 | 9/2006 | Boucher et al. |
| 2006/0233108 A1* | 10/2006 | Krishnan ............ H04J 3/1682 370/235 |
| 2007/0071026 A1 | 3/2007 | Rogers |
| 2007/0091176 A1 | 4/2007 | Shih et al. |
| 2007/0195789 A1 | 8/2007 | Yao |
| 2007/0214248 A1 | 9/2007 | Ikeda et al. |
| 2008/0075003 A1 | 3/2008 | Lee et al. |
| 2008/0089240 A1 | 4/2008 | Toomey et al. |
| 2008/0144586 A1 | 6/2008 | Kneckt et al. |
| 2008/0191816 A1 | 8/2008 | Balachandran et al. |
| 2008/0310452 A1 | 12/2008 | Vedantham et al. |
| 2009/0067328 A1* | 3/2009 | Morris ............ H04W 72/1242 370/230.1 |
| 2009/0086634 A1 | 4/2009 | Kwan et al. |
| 2009/0213871 A1* | 8/2009 | Carlson ............ H04L 12/2801 370/462 |
| 2009/0287405 A1 | 11/2009 | Liu et al. |
| 2010/0014423 A1 | 1/2010 | Furuskar et al. |
| 2010/0085923 A1 | 4/2010 | Nyberg et al. |
| 2011/0016213 A1 | 1/2011 | Nakao |
| 2011/0122887 A1 | 5/2011 | Ma et al. |
| 2011/0134746 A1 | 6/2011 | Liu et al. |
| 2011/0161261 A1 | 6/2011 | Wu et al. |
| 2011/0194538 A1 | 8/2011 | Zheng et al. |
| 2011/0305451 A1 | 12/2011 | Nishitani et al. |
| 2011/0306351 A1 | 12/2011 | Pettersson et al. |
| 2012/0039169 A1 | 2/2012 | Susitaival et al. |
| 2012/0057478 A1 | 3/2012 | Brannstrom et al. |
| 2012/0063377 A1 | 3/2012 | Osterling et al. |
| 2012/0064908 A1 | 3/2012 | Fox et al. |
| 2012/0099430 A1 | 4/2012 | Vos et al. |
| 2012/0116863 A1 | 5/2012 | Boss et al. |
| 2012/0203822 A1 | 8/2012 | Floyd et al. |
| 2012/0330710 A1 | 12/2012 | Hauser et al. |
| 2013/0016675 A1 | 1/2013 | Cha et al. |
| 2013/0051359 A1 | 2/2013 | Skarby |
| 2013/0121147 A1 | 5/2013 | Tapia et al. |
| 2013/0166773 A1 | 6/2013 | Armstrong et al. |
| 2013/0201996 A1 | 8/2013 | Masputra et al. |
| 2014/0146666 A1 | 5/2014 | Kwan et al. |
| 2014/0173025 A1 | 6/2014 | Killick |
| 2014/0180575 A1 | 6/2014 | Lin |
| 2014/0269962 A1 | 9/2014 | Gao et al. |

* cited by examiner

UPSTREAM BANDWIDTH MANAGEMENT METHODS AND APPARATUS

CROSS-REFERENCE TO RELATED APPLICATIONS

This application is a continuation of U.S. application Ser. No. 11/082,244, filed on Mar. 16, 2005, the entire disclosure of which is herein incorporated by reference.

BACKGROUND OF THE INVENTION

1. Field of the Invention

The present invention relates to communication systems and, more particularly, to the management of upstream (i.e., client to server) communication channel utilization levels within an asymmetric communications system such as a cable television system.

2. Description of the Related Art

Asymmetric communications systems such as cable television system, satellite television systems, and the like are characterized by very high bandwidth downstream communication channels, for communicating from a server, head-end or other upstream node to one or more client devices such as set-top boxes (STBs), and relatively low bandwidth upstream communication channels.

The deployment of new applications such as interactive television (iTV) applications on cable television (CATV) networks increases the amount of upstream traffic. Additionally, the increased upstream traffic tends to be "bursty" rather than constant or predictable. Thus, where multiple client devices such as set top boxes are contending for upstream bandwidth in an increased and unpredictable manner, sufficient upstream bandwidth may at times be unavailable.

SUMMARY OF THE INVENTION

Various deficiencies of the prior art are addressed by the present invention of a system and method for managing bandwidth of an upstream communications channel in a communications system.

The upstream bandwidth utilization of a set top box (STB) or a group of set top boxes is monitored and adapted in response to indicium of utilization level via propagated downstream control signaling or generated at the STB. The STB or group of STBs responsively prioritizes upstream communication of applications, cancels or postpones such upstream communications and otherwise modifies upstream channel signaling in a manner adapted to maximize application satisfaction of a user community. In one embodiment, a centralized monitoring and processing technique is utilized, while in other embodiments each STB or group of STBs performs its own respective monitoring and adaptation.

BRIEF DESCRIPTION OF THE DRAWINGS

The teachings of the present invention can be readily understood by 10 considering the following detailed description in conjunction with the accompanying drawings, in which.

To facilitate understanding, identical reference numerals have been used, where possible, to designate identical elements that are common to the 20 figures.

DETAILED DESCRIPTION

The present invention will be generally described within the context of an asymmetric communications system in which upstream bandwidth utilization is monitored by a centralized element within the system or by a set top box. In the case of centralized monitoring, bandwidth utilization information is propagated from the monitoring element to the set top box via a downstream communications channel. The set top box, in response to the monitoring information received by the downstream communications channel and/or locally derived monitoring information, adapts the transmission of data via the upstream channel. It will be appreciated by those skilled in the art that while the invention has specific utility within the context of an asymmetric communications system having a relatively low bandwidth upstream communications channel, the invention may also be utilized within the context of a symmetric communications system in which upstream and downstream bandwidth are comparable.

Figure 1:
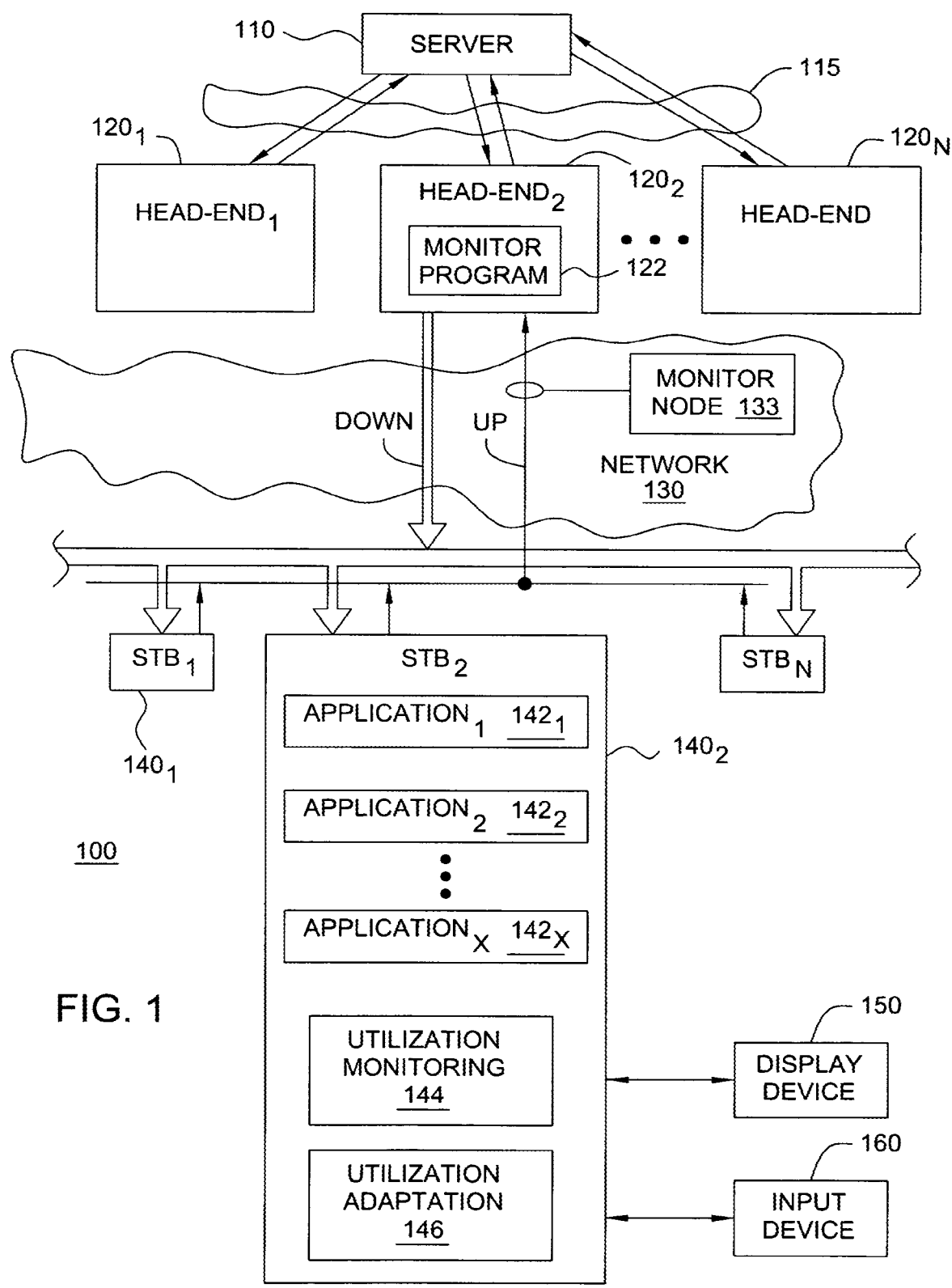
FIG. 1 depicts a high-level block diagram of an information distribution system suitable for use with the present invention.

FIG. 1 depicts a high level block diagram of an asymmetrical communication system suitable for use with the present invention. Specifically, the system 100 of FIG. 1 comprises a server 110, a provisioning network 115, a plurality of head-ends $120_1$ through $120_N$ (collectively head-ends 120), a network 130 and a plurality of set-top boxes STBs $140_1$ through $140_N$ (collectively set top STBs 140). Each STB is typically associated with a respective presentation device 150 such as a television or other video display device such as a television and a user input device 160 such as a remote control, pointing device and the like.

The server 110 is used to store and provide various assets such as audio-visual content, music, data and the like to the head-ends 120. The server may be associated with individual or multiple content suppliers and/or application providers. The server 110 communicates with the various head-ends 120 via a provisioning network 115. The provisioning network may comprise any network topology supporting the conveyance of information to and from the server 110. Moreover, while depicted as separate components, the invention may be implemented within a system wherein the server 110 and head-end 120 are implemented within the same functional element. Generally speaking, the server 110 operates in part to provide information to, and receive information from, the STBs 140 via their respective head-ends 120 and network 130. The information propagated between the server 110 and STBs 140 is processed as appropriate by the head-end 120 and network 130.

Each of the head-ends 120 is associated with a neighborhood of STBs. For simplicity, only those STBs associated with the second head-end $120_2$ are shown and described herein. Each head-end 120 operates to communicate content and other data to its respective neighborhood of STBs by broadcast channels received by all STBs, narrowcast channels received by some of the STBs or point cast channels received by individual STBs. The head-ends 120 also interact with their STBs 140 to establish and tear down sessions with the STBs as necessary to enable the delivery of content, information services, applications, and the like. Generally speaking, the head-ends 120 operate to distribute content and other information provided by the server to the set-top boxes as appropriate, as well as return STB messages, billing information and other data to the server.

Each head-end 120 communicates with the STBs 140 within its neighborhood via a relatively high bandwidth forward or downstream communications channel DOWN and a relatively low bandwidth reverse or upstream communications UP. The downstream DOWN and upstream UP communications channels are supported by a network topology 130, such as a hybrid fiber-coax cable television distribution system, a satellite distribution system (e.g., using a telephone network or reverse satellite link for upstream communications) and the like. While not shown in FIG. 1, an out-of-band (OOB) forward communications channel may also be supported by the network topology 130. In such an implementation of the network topology 130, control messages and other information may be supplied to the STBs 140 via in-band messaging using the downstream communications channel DOWN or via out of-band messaging using the forward communications channel (not shown). Of particular relevance to the present invention, the upstream communication channel UP has a relatively limited amount of bandwidth.

Within the system 100 of FIG. 1, the client or STBs 140 may comprise, illustratively, "heavy" set top boxes or "thin" set top boxes, where a heavy STB or client has significant computational and/or memory resources while a thin STB or client has constrained memory and/or computational resources. The STBs 140 operate to receive broadcast, narrowcast or point cast information from the head-ends 120 via the network 130 using the downstream communications channel DOWN (or out-of-band forward channel). Additionally, the downstream communications channel DOWN may also convey control or data messages including messages providing the utilization level of the upstream communications channel UP as measured by the monitor program 122 in a head-end 120, the monitor node 132 in the network 130 or some other utilization level measurement source (e.g., in the server 110).

Second STB $140_2$ within the neighborhood associated with second head-end $120_2$ is depicted as including a plurality of application programs $142_1$-$142_x$ (application programs 142), a utilization monitoring program 144 and a utilization adaptation program 146. The application programs 142 may comprise any of the applications used within the context of an STB 140. Each application program 142 may have associated with it a respective priority level. The priority level of messages provided by the application may be the same as the respective application or may differ depending upon the type of message provided by the application. Utilization monitoring program 144 is used in those embodiments of the invention in which local monitoring of the upstream communications channel UP utilization level is provided. The utilization adaptation program 146 is used to adapt the operation of the STB 140 in a manner tending to reduce over utilization of the upstream communications channel UP. The utilization monitoring and adaptation programs/functions will be discussed in more detail below.

At least some of the STBs 140 are configured to execute several applications at one time. For example, an STB 140 may include an electronic program guide (EPG) application, an interactive television (iTV) application, a video-on-demand (VOD) application and the like. Each of these applications may require the propagation of user input back to a corresponding head-end 120 or server 110.

According to an embodiment of the invention, these and other applications running on the STB 140 are prioritized according to their specific requirements. For example, in the case of a VOD application, if a fast forward (FF) and/or rewind (REW) function is provided for user control of requested content, the user experience is substantially degraded if such controls are not effected in a substantially immediate manner. By contrast, in the case of an iTV application in which a user is allowed to vote within a time period about some content or contestant selection on a television program, the user vote simply needs to be propagated to a head-end within a reasonable amount of time. Similarly, in the case of a server-centric EPG where an EPG data base requires updating, control messages requesting such updating may be delayed without unduly affecting the user experience. Thus, each application is assigned a priority level where messages associated with a higher priority application are preferentially transmitted using the upstream communications channel UP.

In another embodiment, an application is given a priority level and all messages associated with that application are given the same priority level. In another embodiment, each message has associated with it a respective priority level, wherein one application may provide messages having different priority levels based on, e.g., message type or urgency. Thus, where a set top box has several applications contending for upstream transmission bandwidth, prioritization of applications and/or application messages is performed to determine which messages will be transmitted where bandwidth constraints prevent all of the message from being transmitted at one time.

In another embodiment, the utilization of the upstream communication channel UP is monitored at a central location, such as a head-end 120 or node within the network 130. Thus, referring to FIG. 1, in one embodiment a monitor program 122 is executed within a head-end 120. In another embodiment, a monitor node 132 within the network 130 operates to monitor the upstream communications channel UP. It will be appreciated that the monitor node 132 may be used to monitor a plurality of upstream communications channel UP if accessible.

With the context of the present invention, the clients or STBs 140 adapt their respective demands upon the upstream communications channel UP in response to various factors. Such factors include the amount of data or messages necessary to transmit towards a head-end 120, the priority of that data or message, the priority of the application associated with that data or message, the urgency or criticality of that message (e.g., emergency message such as E911 and the like) and so on.

Figure 2:
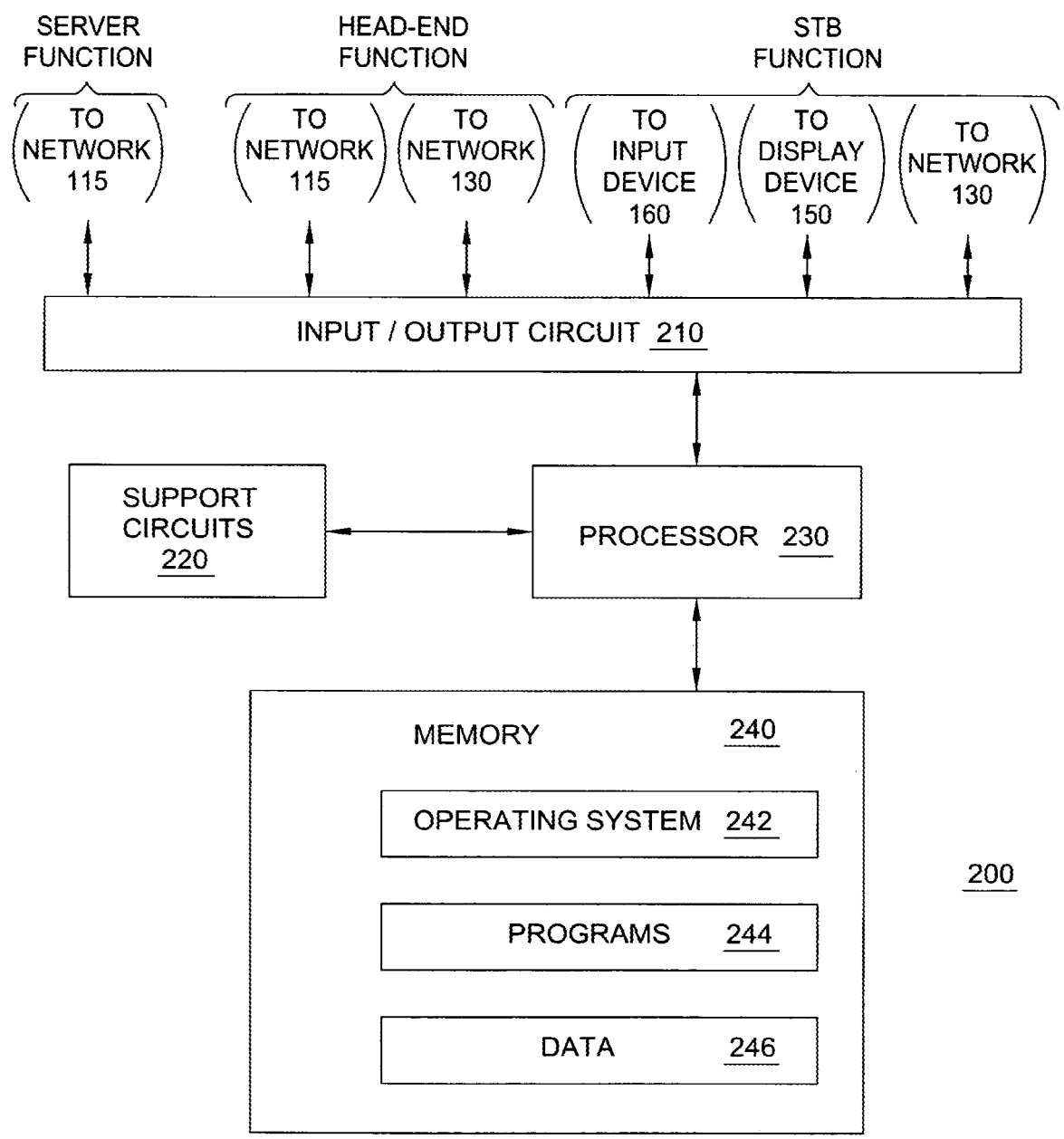
FIG. 2 depicts a high level block diagram of a controller topology suitable 15 for use in the information distribution system of FIG. 1.

FIG. 2 depicts a high level block diagram of a controller topology suitable for use in the information distribution system of FIG. 1. Specifically, the controller 200 of FIG. 2 may be employed to implement relevant functions within the server 110, head-end 120, network 130 and/or STB 140.

The controller 200 of FIG. 2 comprises a processor 230 as well as memory 240 for storing various control programs and other programs 244 and data 246. The memory 240 may also store an operating system 242 supporting the programs 244.

The processor 230 cooperates with conventional support circuitry such as power supplies, clock circuits, cache memory and the like as well as circuits that assist in executing the software routines stored in the memory 240. As such, it is contemplated that some of the steps discussed herein as software processes may be implemented within hardware, for example as circuitry that cooperates with the processor 230 to perform various steps. The controller 200 also contains input/output (I/O) circuitry 210 that forms an interface between the various functional elements communicating with the controller 200.

Although the controller 200 is depicted as a general purpose computer that is programmed to perform various control functions in accordance with the present invention, the invention can be implemented in hardware as, for example, an application specific integrated circuit (ASIC) or field programmable gate array (FPGA). As such, the process steps described herein are intended to be broadly interpreted as being equivalently performed by software, hardware or a combination thereof.

Topologies such as depicted with respect to the controller 200 of FIG. 2 may be advantageously employed within the context of the server 110, head-end 120, network 130 and/or STB 140. That is, by utilizing appropriate operating systems 242, programs 244 and/or data 246, the topology depicted with respect to controller 200 is used to realize the functional elements discussed herein with respect to the various figures. As noted in FIG. 2, the 10 circuitry 210 communicates with network 115 as part of a server function, communicates with network 115 and network 130 as part of a head-end function, and communicates with input device 160, display device 150, and network 130 as part of an STB function.

The invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a signal bearing medium such as a broadcast medium, and/or stored within a working memory within a computing device operating according to the instructions.

Figure 3:
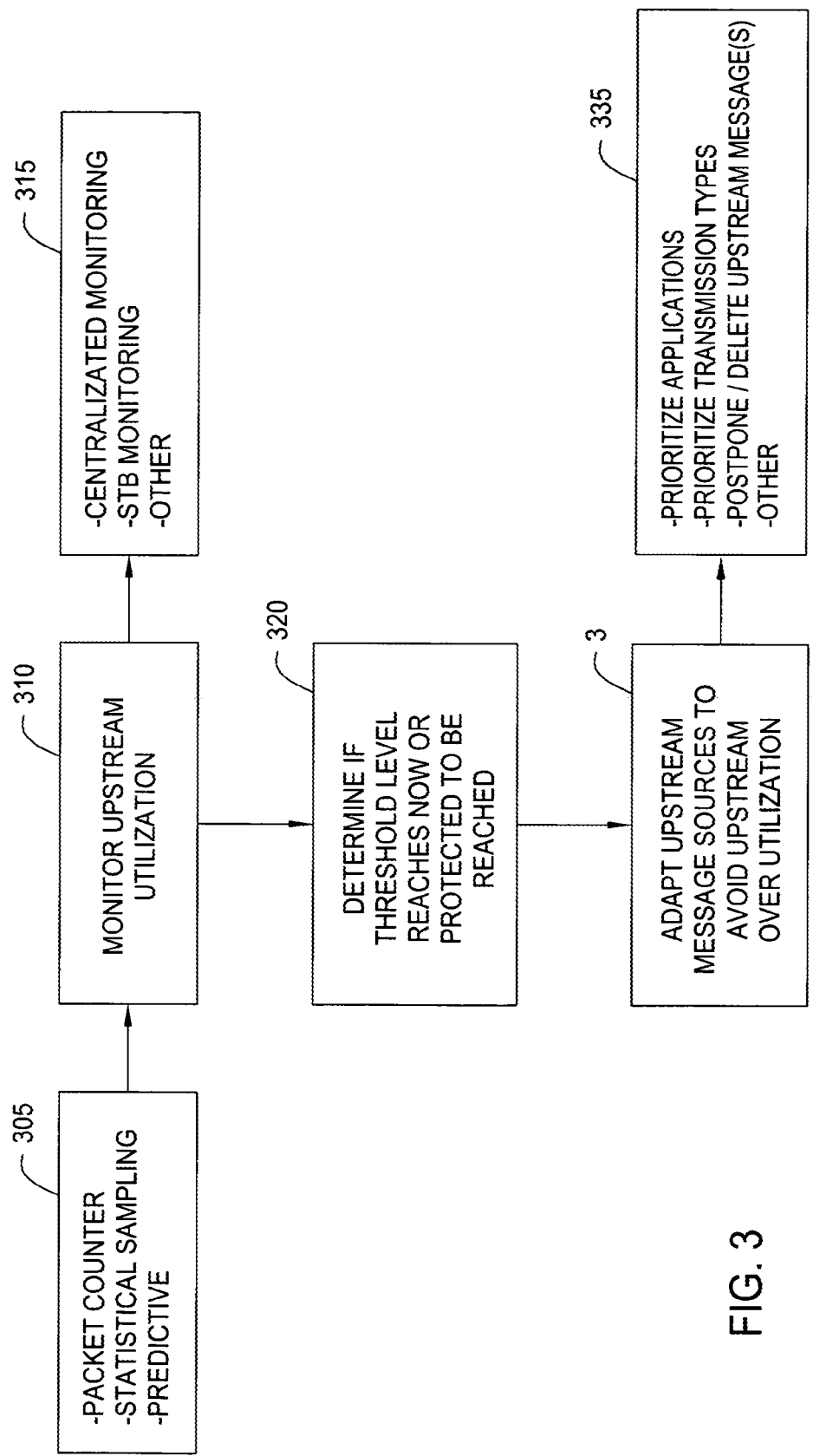
FIGS. 3 and 4 depict flow diagrams of methods according to embodiments of the present invention.

FIG. 3 depicts a flow diagram of a method according to an embodiment of the present invention. Specifically, the method 300 of FIG. 3 contemplates several system functions suitable for use in accordance with the present invention; namely, a centralized and/or client-side upstream utilization monitoring function, and a client-side upstream utilization adaptation function.

The method 300 of FIG. 3 is entered at step 310, where the upstream communication path utilization is monitored. Referring to box 315, a centralized monitoring method may be used, a set top box monitoring method may be used, or some other monitoring method may be used. Monitoring may occur at a centralized point such as a remote server (e.g., server 110), a head-end 120, a node 132 within the network 130 or some other centralized point. Alternatively, monitoring may occur at a non-centralized point such as a particular STB or group of STBs 140.

Referring to box 305, the monitoring may comprise the counting of upstream packets, the statistical sampling of traffic on the upstream communications channel UP, predictive knowledge pertaining to expected upstream usage patterns and the like.

In the case of packet counting, an upstream communications channel UP having a known bandwidth is capable of transmitting a known number of packets per second. Thus, by counting the number of packets conveyed by the upstream communications channel UP during a predefined time interval (e.g., a second), the bandwidth utilization level of the upstream communications channel UP may be determined. Similarly, rather than counting all the packets conveyed by the upstream communications channel UP, a statistical sampling of the conveyed traffic may be performed to determine an approximate utilization level. The approximate utilization level will typically be of sufficient accuracy. Finally, predictive knowledge may also be employed to determine future changes or likely changes in the utilization level of the upstream communications channel UP utilization level. For example, in the case of an interactive television program requiring user input at a predetermined time, increased utilization will occur proximate that time by STBs running the iTV application. Similarly, at the end of a programming interval such as a half hour or one hour programming interval, or at the end of a pay-per-view (PPV) program, users will likely propagate upstream commands associated with electronic program guide applications and/or VOD applications to select new content for viewing. Thus, predictive knowledge may comprise knowledge of particular applications to be employed, knowledge of particular user behaviors and the like. This knowledge may be determined at a head-end and propagated to the set top boxes to assist in prioritizing applications and/or upstream messages.

At step 320, a determination is made if the threshold utilization level of the upstream communications channel UP has been reached (e.g., via direct monitoring techniques) or is projected to be reached (e.g., via predictive techniques). That is, at step 320 a determination is made using the packet counting, statistical sampling and/or predictive techniques discussed above to determine if a threshold level of utilization has been or will shortly be reached.

At step 330, the upstream message sources are adapted to avoid over-utilization of the upstream communications channel UP. Referring to box 335, such adaptation may encompass the prioritization of applications, the prioritization of transmission or message types, the postponement or deletion of the transmission of upstream messages and other techniques. An adaptation routine will be discussed in more detail below with respect to FIG. 4.

In one embodiment of the invention, upstream utilization monitoring is conducted at a head-end 120. In this embodiment of the invention, any of the packet counting statistical counting, statistical sampling and predictive monitoring techniques may be employed. Within the context of head-end 120 or server 110 monitoring of upstream utilizing levels, the predictive modeling of the upstream utilization may be influenced by global factors associated with multiple set top boxes or groups of set top boxes. For example, if at 8:00 p.m. on a Tuesday evening an interactive broadcast of a television program such as Survivor is provided, it can be safely predicted that significant upstream bandwidth utilization will occur as set top box users vote and/or otherwise interact via the upstream communications channel UP.

Figure 4:
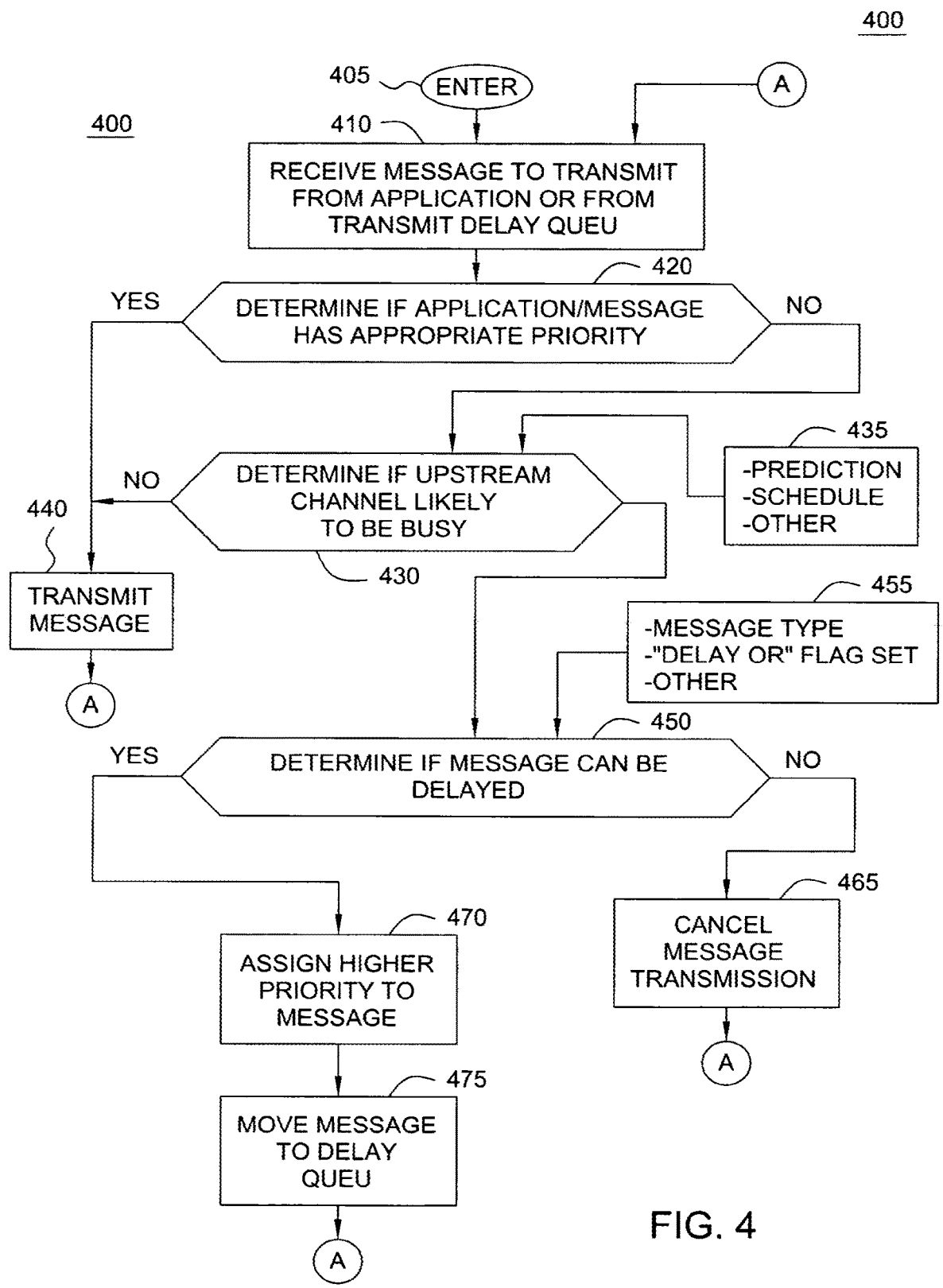

FIG. 4 depicts a flow diagram of a method according to an embodiment of the present invention. Specifically, FIG. 4 depicts a flow diagram of a transmission adaptation method 400 suitable for use in, for example, an STB 140 within the system 100 of FIG. 1. The method 400 of FIG. 4 may also be used to implement step 330 of the method 300 of FIG. 3.

The method 400 is entered at step 405 and proceeds to step 410, where a message to be transmitted via the upstream communications channel UP is received from an application or from a transmit delay queue within the STB. That is, within the context of the present invention, a STB 140 has operating therein one or more applications such as EPG, VOD, iTV and the like. Optionally, a transmit delay queue or buffer is implemented within the STB 140 to temporarily store messages prior to transmission.

At step 420, a determination is made if the application or message has an appropriate priority level. That is, at step 420 a determination is made as to whether the priority level of the application and/or message is above a threshold priority level. If the priority level is above the threshold level, then the message is transmitted via the upstream communication channel UP at step 440 and the method proceeds to 410 to wait for the next message for transmission.

If the application or message priority level is insufficient, then at optional step 430 a determination is made if the upstream channel is likely to be busy at this time. Such determination may be made, per box 435, via prediction techniques, known application or programming scheduling INFORMATION, or other means. If the upstream channel is not likely to be busy, then at step 440 the message is transmitted and the method returns to step 410 to await the next message. If the upstream channel is likely to be busy, then the method proceeds to step 450.

At step 450, a determination is made if the message can be delayed. Referring to box 455, this determination is made with respect to the type of message (e.g., VOD central function such as FF/REW, EPG select and the like) message type, the setting of a "delay OK" flag or other means. The "delay OK" flag is an optional attribute associated with a message by its application. Some message types may be delayed with little or no consequence, while other message types require immediate transmission or they cannot achieve their intended result. If the message cannot be delayed, then at step 465 the transmission of the message is canceled and the method proceeds to step 410. If the message can be delayed, then at optional step 470 the message is optionally assigned a higher priority level prior to being moved to the delay queue at step 475. The method returns then to step 410.

The above-described embodiments of the invention envision the adaptation of upstream communications channel usage by individual STBs in response to utilization level messages received from a downstream communications channel (in-band or out-of-band) or by STB-determined utilization levels. It will be appreciated by those skilled in the art that various modifications may be made to the above methods, system and apparatus while practicing the present invention. As noted above in the various figures, certain process steps are denoted as optional, in which case such steps may be omitted. Furthermore, the particular order of the process steps described herein may be rearranged. Thus, referring to FIG. 4, the determinations of priority level, upstream channel availability, message delay and the like may be executed in any other order.

The above-described invention provides for adapting upstream communications channel transmissions within a set top box in response to a determination that a utilization level of the upstream communications channel exceeds a threshold level. This determination may be made at the set top box or at a centralized location using one or more of the various techniques described herein. The adaptation may comprise delaying, canceling, and/or otherwise prioritizing the transmission of data messages via the upstream communications channel.

A transmit delay queue may be implemented wherein data messages associated with a delay in transmission are temporarily stored. The transmit delay queue is periodically accessed to retrieve messages for transmission during low utilization periods or, optionally, where increase in priority levels of stored messages have raised their corresponding priority levels to above a threshold level. Methodology according to the present invention may be implemented within the context of an application programming interface (API) associated with a set top box middleware environment, such as the middleware products provided by Liberate Technologies, Inc. of San Mateo, Calif. In the case of the API implementation as well as other methods, systems and implementations, the present invention is optionally adapted to receive one or more parameters associated with either the utilization level determining function and utilization level adaptation function. Parameters associated with the utilization determination function comprise, illustratively, selection of a technique for determining utilization level, selection of threshold utilization levels and the like. Utilization adaptation parameters comprise, illustratively, transmit delay buffer related parameters, message delay parameters, "time to kill" packet parameters, setting or resetting of a "delay OK" flag associated with messages, message type priority organization, application priority organization and the like. Other parameters will be discernable to those skilled in the art and informed by the teachings of the present invention.

While the foregoing is directed to certain embodiments of the present invention, these embodiments are meant to be illustrative, not limiting. Other and further embodiments of the invention may be devised without departing from the basic scope thereof and the scope thereof is determined by the claims that follow.

What is claimed is:

1. A method comprising:
   determining a message associated with a first priority level, wherein the message is associated with an upstream communications channel;
   determining, based on data associated with transmission via a downstream communications channel, an expected upstream usage pattern;
   determining, based on the expected upstream usage pattern, a predicted bandwidth utilization of the upstream communications channel; and
   associating, based on determining that the predicted bandwidth utilization of the upstream communications channel satisfies a threshold and that transmission of the message via the upstream communications channel is delayable, the message with a second priority level different from the first priority level.

2. The method of claim 1, wherein the determining that the predicted bandwidth utilization of the upstream communications channel satisfies the threshold comprises determining that the upstream communications channel is predicted to lag.

3. The method of claim 1, wherein the determining the predicted bandwidth utilization is further based on how users are predicted to interact with the data.

4. The method of claim 1, wherein the second priority level is associated with a lower priority than the first priority level.

5. The method of claim 1, wherein the data is associated with a scheduled termination of non-interactive content.

6. The method of claim 1, wherein the determining the expected upstream usage pattern comprises:
   estimating programming intervals associated with upstream commands to select new content for viewing.

7. The method of claim 1, further comprising:
   assigning, based on determining that the message relates to a content supplier, the message a higher priority.

8. The method of claim 1, wherein the associating the message is further based on determining that transmission of the message via the upstream communications channel is delayable is based on a type of the data.

9. A method comprising:
  determining a message associated with a first priority level, wherein the message is associated with an upstream communications channel;
  determining, based on data associated with transmission via a downstream communications channel, an expected upstream usage pattern;
  determining, based on the expected upstream usage pattern, a predicted bandwidth utilization of the upstream communications channel;
  associating, based on determining that the predicted bandwidth utilization of the upstream communications channel satisfies a threshold and that transmission of the message via the upstream communications channel is delayable, the message with a second priority level different from the first priority level; and
  associating, based on determining that the predicted bandwidth utilization of the upstream communications channel no longer satisfies the threshold, a subsequent message with the first priority level.

10. The method of claim 9, wherein the determining the predicted bandwidth utilization is further based on predictive modeling of the upstream communications channel.

11. The method of claim 9, wherein the determining the expected upstream usage pattern is further based on knowledge of particular user behaviors.

12. The method of claim 9, wherein the second priority level is associated with a lower priority than the first priority level.

13. The method of claim 9, wherein the data is associated with a scheduled termination of non-interactive content.

14. A method comprising:
  monitoring, by a device, a plurality of current bandwidth utilization levels of a corresponding plurality of upstream communications channels;
  determining, by the device, based on the plurality of current bandwidth utilization levels, and based on data associated with transmission via one or more downstream communications channels, a plurality of predicted future bandwidth utilization levels of the corresponding plurality of upstream communications channels, wherein determining the plurality of predicted future bandwidth utilization levels comprises estimating programming intervals associated with upstream commands to select new content for viewing;
  determining, by the device, that at least one of the plurality of predicted future bandwidth utilization levels satisfies a threshold; and
  transmitting information indicating that the threshold has been satisfied by the at least one of the plurality of predicted future bandwidth utilization levels.

15. The method of claim 14, wherein each of the plurality of upstream communications channels is associated with a corresponding one of a plurality of user devices.

16. The method of claim 14, wherein the monitoring the plurality of current bandwidth utilization levels further comprises counting upstream packets.

17. The method of claim 14, wherein the monitoring the plurality of current bandwidth utilization levels further comprises counting upstream packets during a specific time interval.

18. The method of claim 14, wherein the monitoring the plurality of current bandwidth utilization levels further comprises sampling traffic on the plurality of upstream communications channels.

19. The method of claim 14, wherein the data comprises interactive content.

20. A method comprising:
  determining, by a computing device and based on data associated with transmission via one or more downstream communications channels, an expected upstream usage pattern, wherein determining the expected upstream usage pattern comprises estimating programming intervals associated with upstream commands that are associated with content suppliers and used to select new content for viewing;
  determining, by the computing device and based on the expected upstream usage pattern, a plurality of predicted bandwidth utilization levels of a corresponding plurality of upstream communications channels;
  determining that at least one of the plurality of predicted bandwidth utilization levels satisfies a threshold; and
  transmitting information indicating that the threshold has been satisfied by the at least one of the plurality of predicted bandwidth utilization levels.

21. The method of claim 20, wherein the determining the plurality of predicted bandwidth utilization levels of the corresponding plurality of upstream communications channels comprises analyzing predictive knowledge pertaining to the expected upstream usage pattern.

22. The method of claim 20, wherein the determining the expected upstream usage pattern comprises analyzing predictive knowledge about a plurality of applications and a plurality of user behaviors.

23. The method of claim 20, wherein the determining the expected upstream usage pattern comprises analyzing predictive knowledge associated with a plurality of user devices.

* * * * *